United States Patent
Lipschitz et al.

[11] Patent Number: 5,806,861
[45] Date of Patent: Sep. 15, 1998

[54] SHOP EZ CART ATTACHMENT

[76] Inventors: Sarah Lipschitz, 2021 84 St., #5D, Brookyln, N.Y. 11214; Eric P. Ashenberg, 8811 Burton Way, #403, Los Angeles, Calif. 90048

[21] Appl. No.: 197,799

[22] Filed: Feb. 17, 1994

[51] Int. Cl.⁶ ........................................ B62B 3/14
[52] U.S. Cl. .................. 280/33.992; 224/411; 248/541; 248/231.61
[58] Field of Search ........................ 280/304.1, 33.991, 280/33.992, 33.997, 288.4; 248/231.61, 541; 224/411

[56] References Cited

U.S. PATENT DOCUMENTS

| | | | |
|---|---|---|---|
| 620,616 | 3/1899 | Shoemaker | 248/541 |
| 2,769,895 | 11/1956 | Boord | 248/231.6 |
| 3,195,912 | 7/1965 | Howard et al. | 280/33.992 |
| 4,465,290 | 8/1984 | Hooley | 280/33.992 |
| 4,678,195 | 7/1987 | Trubiano | 280/33.992 |
| 4,878,685 | 11/1989 | Bahm | 280/304.1 |
| 5,181,684 | 1/1993 | Sager | 248/231.6 |
| 5,203,579 | 4/1993 | Lipschitz | 280/33.991 |

*Primary Examiner*—Anne Marie Boehler
*Attorney, Agent, or Firm*—John P. Halvonik

[57] ABSTRACT

A shopping cart attachment for supporting a vertically oriented pole alongside the basket of the cart. The attachment device comprises left and right halves that are joined to one another and around the horizontal and vertical tubular structures near the bottom of the cart. Each half has two semicircular flanges adapted to fit around each tubular portion. One of the halves has an extended portion having an aperture for supporting the pole thus supporting the pole a short distance away from the cart.

3 Claims, 2 Drawing Sheets

SHOP EZ CART ATTACHMENT

BACKGROUND OF THE INVENTION

The invention relates to the field of shopping carts and in particular to one that has a pole mounted on, or adjacent to, the cart basket. The invention described herein is secured to a shopping cart by being attached to the tubular structures that are found near the bottom of most shopping carts.

Most shopping carts nowadays are made of a framework which usually comprises tubular metal members. Near the bottom of most such carts are found tubular framework members, one of which runs horizontal (and hence parallel to the ground when the cart is in normal use) and another in connection with that one that runs vertical or nearly so. It is found that the present device will be readily able to convert most such shopping carts to a cart equipped with a vertically oriented pole by attaching the device described herein to those tubular framework members at the bottom of the cart.

There are any number of poles or other vertical supports that may find utility in the shopping cart field and can be used with the device disclosed herein. One such vertical structure is shown in U.S. Pat. No. 5,203,579 to applicant Lipschitz which provides a vertical support for holding such items as garment hangers. Such supports may find utility in adding additional storage space for a shopping cart to increase the number of items that may be carried by the shopper.

In the invention described herein, the support device is attached to the tubular framework at the bottom of the cart. This device, in turn, has an extended portion at one side to enable a pole or other vertical support structure to be held upright at one side of the basket portion of the cart. Placement of such a support device at one side of the cart allows the carts to be nested within one another without hindrance by the support device.

While there are support structures for holding garments, etc. there are no devices that the applicants are aware of that support a vertically oriented structure from the side of the shopping cart. Nor is applicant aware of any such vertical supports that may be added to shopping carts in order to be able to retrofit shopping carts with vertical supports.

SUMMARY OF THE INVENTION

A shopping cart attachment device comprising left and right halves that are joined together around the horizontal and vertical tubular structures near the bottom of the cart. Each halve has two flange portions corresponding to the vertical and horizontal tubes of the cart basket. When the halves are joined to one another the flanges meet and form tubular shaped structures that fit around each tubular portion. The halves are joined to one another by any state of the art means that can connect the halves to one another. One of the halves has an extended portion having an aperture for supporting the pole thus, supporting the pole at a short distance away from the cart.

It is an object of the invention to provide an add on attachment to shopping carts that will support a pole or similar structure in a vertical orientation adjacent to the cart basket.

Another objective is to provide a support for a pole that may be attached to shopping carts by joining to the tubular structures found near the bottom of most modern day shopping carts.

Another objective is to enable shopping carts to be retrofitted with vertically oriented structures in order to enable such carts to carry more items such as clothing, etc. Other objectives of the invention should be readily apparent to those skilled in the art once the invention has been described.

DESCRIPTION OF THE PREFERRED EMBODIMENT

Figure 3:
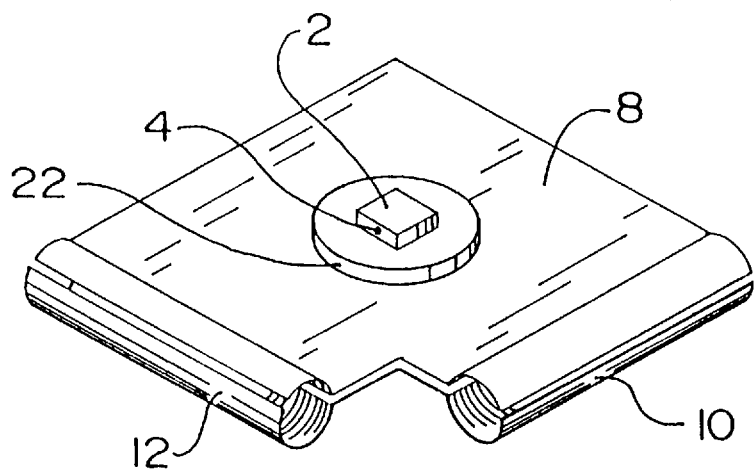
FIG. 3 Side view of right half.

The overall construction of the device is shown in FIG. 3. The device comprises essentially a left and right half and an extended portion 2 on one of the halves. The extended portion may be on either half depending on which side of the cart that one intends to attach the device.

Figure 2:
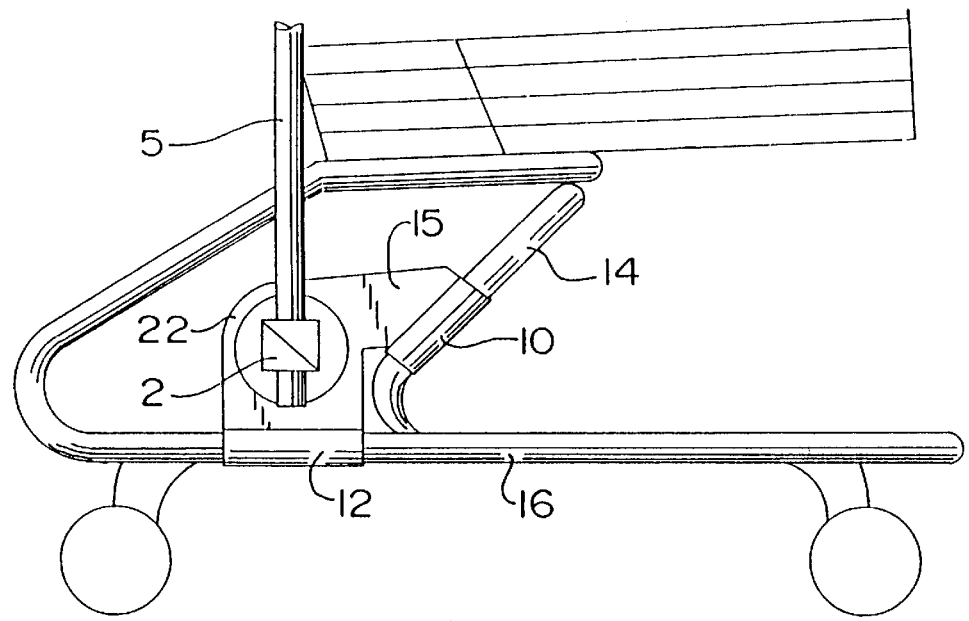
FIG. 2 Device in place with alternate orientation of tubular cart basket member.
Figure 1:
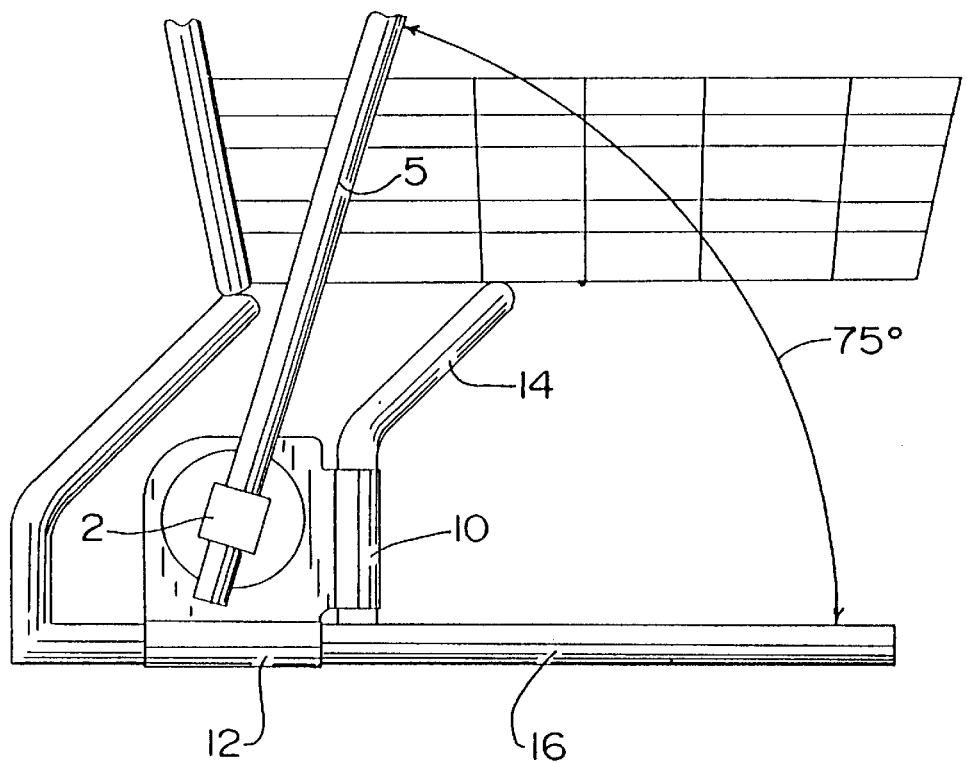
FIG. 1 Article in use attached to cart.
Figure 4:
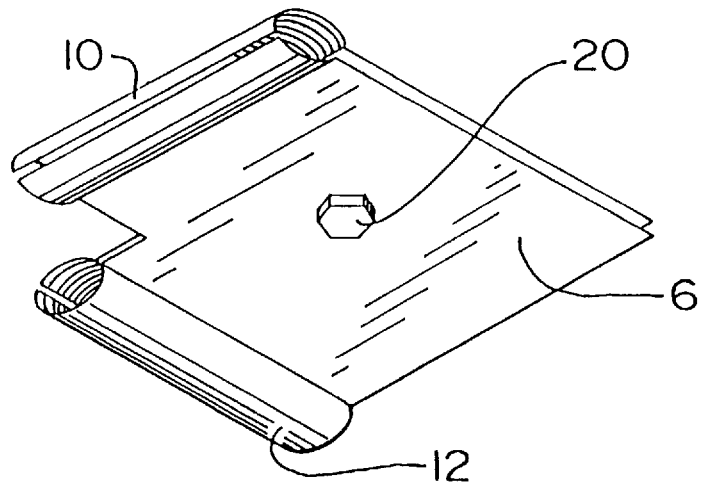
FIG. 4 Side view of corresponding left half.

If the device is attached to the left side of the cart, the extended portion should be found on the left half and vice versa. Thus the device may come as a left or right handed version. In FIG. 1–3 the left half is shown with the extended portion and the right half shown in FIG. 4 complements the left half and may be attached to it via, screws, bolts, etc. For purposes of convenience, we may refer to this version as the right hand version-with understanding that a left handed version could be made as a-mirror image of that one.

The extension piece has an aperture 4 for placement of the pole 6 or similar structure in the aperture. The pole may be of various shapes and have various extended portions to facilitate its purpose of supporting articles such as clothing etc. It is preferred that the pole have a horizontal portion across the top, creating a "T" shaped conformation so that at least one of the horizontal portions of the "T" overhangs the basket of the cart.

Each half has two flanges, an upper flange 10 and a lower flange 12. The upper flange may be said to be at one side of the flat center portion (8 or 6) and the lower flange may be said to be at the bottom edge of that center portion. These two flanges may be placed around the vertical tubular member 14 and fixed against it by means of bolts 20, screws, etc.

Each flange is of semicircular cross section so that, as the halves are joined to one another, each flange will meet its opposite member (on the other half) and the resulting meeting will form a tubular shaped portion that may fit around the framework of the cart, viz. tubular members 14 and 16. There are apertures (not shown) in each half that provide a place for a threaded bolt 20 or other connecting device to join the halves to one another. There may be, for example, an aperture in that portion of the flat section 8 that underlies the base 22 as well as one in the other flat portion 6 where the top of the bolt 20 is shown. There may be a threaded portion in the under side of base 22 in order to secure one end of the bolt.

It is seen that the flat, connective portion (shown as 6 and 8) of each halve and the flanges will define a plane. The tubular portions of the framework will lie in this plane and the extension piece 2 will extend away from one of the halves in a direction perpendicular to this plane so that this extended portion 2 extends from the side of the cart for placement of the vertical member 6.

In FIG. 1 and 2 can be viewed the structure of the lower tubular members of the cart. These may be referred to as the horizontal 12 and vertical 14 members respectively. The upper flange of each of the halves will be joined around the vertical member and the lower flange of each will be joined around the horizontal member. The halves are then secured to one another through the use of the bolt 20, or other connecting device, that connects through aperture(s) in each half.

It will be noted that the vertical member is usually found in one of two orientations in most carts. It may lie almost vertical (and hence perpendicular to the horizontal bar) as seen in FIG. 1 or may be somewhat at angle to vertical as seen in FIG. 2. Because of this it may be necessary to make different versions of the device that differ in the orientation of the upper flange vis a vis the lower flange. This is to facilitate the attachment of the upper flange to the vertical member which may be oriented differently on, different carts.

In a first version, FIG. 2 the upper flange is seen at about a 45° angle to vertical. There is a small connecting portion 15 that connects the upper flange to the flat center portion (6 or 8) of the device to facilitate this. An alternate version is seen in FIG. 1 and here the upper flange is seen in a vertical or nearly vertical orientation vis a vis the lower flange. Otherwise the two versions are identical.

After the flanges are joined to one another, the pole or similar member may be inserted into the aperture 4 and locked into place by any state of the art means. It is preferred that the pole be in an upright, position to facilitate the support of clothes, etc. this is seen in FIG. 2.

It is preferred that the attachable halves be made out of sturdy materials such as metals or possibly plastic. The pole may be made of metal, wood, plastic, etc. The apparatus should be strong enough to support a three or four foot long metal pole and should have strong enough fastening means to securely join the flanges to one another.

We claim:

1. An attachment device for placement around the lower tubular framework of shopping carts said apparatus comprising: a left half having a main portion having a bottom edge and sides and an upper flange in connection with one of said sides and a lower flange in connection with said bottom edge, each of said flanges having a cross section of about semicircular shape, a right half having a main portion having a bottom edge and sides and an upper flange in connection with one of said sides and a lower flange in connection with said bottom edge, each of said flanges having a cross section of about semicircular shape so that when said left and right halves are joined to one another said upper and lower flanges will align with one another so as to form a tubular channel for joining around said tubular framework members, one of said halves having an extended portion, said extended portion extending from said device in a direction perpendicular to the plane of said main portion and said upper and lower flanges, said extension portion having an aperture for placement of said pole.

2. The apparatus of claim 1 having a fastening means for joining said left and right halves together.

3. A two piece shopping cart attachment and vertical support combination for connection with shopping carts having a lower wheel base having a vertical support and a horizontal support member; said combination comprising a first part connective member having means for attachment to one side of said vertical and said horizontal support members and having a supporting means, said second part vertical support for attachment to said supporting means.

* * * * *